United States Patent
Shao et al.

(10) Patent No.: US 11,355,113 B2
(45) Date of Patent: Jun. 7, 2022

(54) METHOD, APPARATUS, DEVICE AND COMPUTER READABLE STORAGE MEDIUM FOR RECOGNIZING AND DECODING VOICE BASED ON STREAMING ATTENTION MODEL

(71) Applicant: Baidu Online Network Technology (Beijing) Co., Ltd., Beijing (CN)

(72) Inventors: Junyao Shao, Beijing (CN); Sheng Qian, Beijing (CN); Lei Jia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 110 days.

(21) Appl. No.: 16/813,271

(22) Filed: Mar. 9, 2020

(65) Prior Publication Data
US 2021/0020175 A1     Jan. 21, 2021

(30) Foreign Application Priority Data
Jul. 17, 2019   (CN) .......................... 201910646762.1

(51) Int. Cl.
*G10L 15/22*     (2006.01)
*G10L 15/197*    (2013.01)
(Continued)

(52) U.S. Cl.
CPC .............. *G10L 15/22* (2013.01); *G10L 15/02* (2013.01); *G10L 15/197* (2013.01); *G10L 15/32* (2013.01); *G10L 2015/027* (2013.01)

(58) Field of Classification Search
None
See application file for complete search history.

(56) References Cited

U.S. PATENT DOCUMENTS

| 7,216,077 B1* | 5/2007 | Padmanabhan ....... G10L 15/065 704/240 |
| 8,972,243 B1* | 3/2015 | Strom .................... G10L 15/193 704/9 |

(Continued)

FOREIGN PATENT DOCUMENTS

| JP | H10198392 A | 7/1998 |
| JP | 2002073078 A | 3/2002 |

(Continued)

OTHER PUBLICATIONS

"A Breakthrough in Speech Technology; Baidu Launched SMLTA, the First Streaming Multi-layer Truncated Attention Model for Large-scale Online Speech Recognition"; Baidu Research; published Jan. 21, 2019; retrieved from http://research.baidu.com/Blog/index-view?id=109 on Jul. 26, 2021 (3 pages).

*Primary Examiner* — Shaun Roberts
(74) *Attorney, Agent, or Firm* — Nixon Peabody LLP

(57) ABSTRACT

A method, apparatus, device, and computer readable storage medium for recognizing and decoding a voice based on a streaming attention model are provided. The method may include generating a plurality of acoustic paths for decoding the voice using the streaming attention model, and then merging acoustic paths with identical last syllables of the plurality of acoustic paths to obtain a plurality of merged acoustic paths. The method may further include selecting a preset number of acoustic paths from the plurality of merged acoustic paths as retained candidate acoustic paths. Embodiments of the present disclosure present a concept that acoustic score calculating of a current voice fragment is only affected by its last voice fragment and has nothing to do with earlier voice history, and merge acoustic paths with the identical last syllables of the plurality of candidate acoustic paths.

18 Claims, 5 Drawing Sheets

(51) Int. Cl.
*G10L 15/02* (2006.01)
*G10L 15/32* (2013.01)

(56) References Cited

U.S. PATENT DOCUMENTS

| | | | |
|---|---|---|---|
| 9,613,624 B1* | 4/2017 | Kramer | G10L 15/08 |
| 10,229,672 B1* | 3/2019 | Rao | G10L 15/16 |
| 10,777,186 B1* | 9/2020 | Stefani | G10L 15/04 |
| 2005/0075877 A1* | 4/2005 | Minamino | G10L 15/083 |
| | | | 704/254 |
| 2005/0203738 A1* | 9/2005 | Hwang | G10L 15/063 |
| | | | 704/243 |
| 2005/0288929 A1* | 12/2005 | Kuboyama | G10L 15/142 |
| | | | 704/251 |
| 2011/0191100 A1* | 8/2011 | Okabe | G10L 15/187 |
| | | | 704/10 |
| 2017/0053652 A1 | 2/2017 | Choi et al. | |
| 2018/0190268 A1 | 7/2018 | Lee et al. | |
| 2018/0336466 A1 | 11/2018 | Braun et al. | |
| 2019/0013008 A1* | 1/2019 | Kunitake | G10L 15/22 |
| 2019/0189115 A1 | 6/2019 | Hori | |

FOREIGN PATENT DOCUMENTS

| | | |
|---|---|---|
| JP | 2017040919 A | 2/2017 |
| JP | 2018109760 A | 7/2017 |
| JP | 2019514045 A | 5/2019 |

\* cited by examiner

METHOD, APPARATUS, DEVICE AND COMPUTER READABLE STORAGE MEDIUM FOR RECOGNIZING AND DECODING VOICE BASED ON STREAMING ATTENTION MODEL

CROSS-REFERENCE TO RELATED APPLICATIONS

This application claims priority to Chinese Patent Application No. 201910646762.1, filed on Jul. 17, 2019, titled "Method, Apparatus, Device and Computer Readable Storage Medium for Recognizing and Decoding Voice based on Streaming Attention Model," which is hereby incorporated by reference in its entirety.

TECHNICAL FIELD

Embodiments of the present disclosure generally relate to the field of voice recognition technology, and more specifically to a method, apparatus, device, and computer readable storage medium for recognizing and decoding a voice based on a streaming attention model.

BACKGROUND

Voice recognition refers to a process of converting a voice signal into a corresponding text by a computer, and is one of the main approaches for achieving man-machine interaction. In recent years, with the extensive use of deep learning technology in the field of voice recognition, the accuracy rate of voice recognition has been greatly improved. In addition, due to the increasing popularity of smart devices, scenarios where voice is used for recognition have become very abundant. For example, the voice recognition technology has been widely used in various scenarios, such as voice input, voice dialing, and vehicle navigation. The voice recognition technology, when being combined with technologies such as natural language processing and voice synthesis, can produce more complex applications, such as smart speaker, simultaneous conference interpretation, and smart customer service assistant. The accuracy rate of voice recognition directly affects the user experience of voice-related product users. Therefore, as the use scenarios of voice recognition are increasingly abundant, higher requirements for the accuracy rate of voice recognition are presented.

Streaming voice recognition is a voice recognition technology that supports real-time processing, and refers to recognizing, for consecutive voices transmitted by streaming, each fragment of the voice, such that a recognition result can be obtained in real time without waiting for completing inputting all voices before starting a recognition process. For example, in a scenario where a user expects to see the recognition result displayed in real time whilst talking, a voice recognition system needs to quickly decode a voice signal in time and output the recognition result in real time whilst maintaining a high recognition rate. Generally, streaming voice recognition can be realized by a streaming acoustic model. When calculating a score of a current voice, the streaming acoustic model needs not only a signal feature of the current voice, but also previous historical information. Therefore, the streaming acoustic model is a history-dependent acoustic model.

SUMMARY

According to an example embodiment of the present disclosure, a method, an apparatus, a device and a computer-readable storage medium for recognizing and decoding a voice based on a streaming attention model are provided.

In a first aspect of the present disclosure, a method for recognizing and decoding a voice based on a streaming attention model is provided. The method includes: generating a plurality of acoustic paths for decoding the voice using the streaming attention model; merging acoustic paths with identical last syllables among the plurality of acoustic paths to obtain a plurality of merging acoustic paths; and selecting a preset number of acoustic paths from the plurality of merging acoustic paths.

In a second aspect of the present disclosure, an apparatus for recognizing and decoding a voice based on a streaming attention model is provided. The apparatus includes: an acoustic path generating module configured to generate a plurality of acoustic paths for decoding the voice using the streaming attention model; an acoustic path merging module configured to merge acoustic paths with identical last syllables among the plurality of acoustic paths to obtain a plurality of merging acoustic paths; and an acoustic path selecting module configured to select a preset number of acoustic paths from the plurality of merging acoustic paths.

In a third aspect of the present disclosure, an electronic device is provided. The electronic device includes one or more processors and a storage apparatus for storing one or more programs, where the one or more programs, when executed by the one or more processors, cause the electronic device to implement the methods and/or processes according to embodiments of the present disclosure.

In a fourth aspect of the present disclosure, a computer readable storage medium is provided. The computer readable storage medium stores a computer program, where the program, when executed by the processor, implement the methods and/or processes according to embodiments of the present disclosure.

It should be understood that the description is not intended to limit the key features or important features of the embodiments of the present disclosure, nor is it intended to limit the scope of the present disclosure. Other features of the present disclosure will be easily understood by the following description.

BRIEF DESCRIPTION OF THE DRAWINGS

In conjunction with the drawings and with reference to detailed descriptions below, the above and other features, advantages, and aspects of various embodiments of the present disclosure will become more apparent. In the g drawings, same or similar reference numerals in the drawings represent same or similar elements.

DETAILED DESCRIPTION OF EMBODIMENTS

Figure 1:
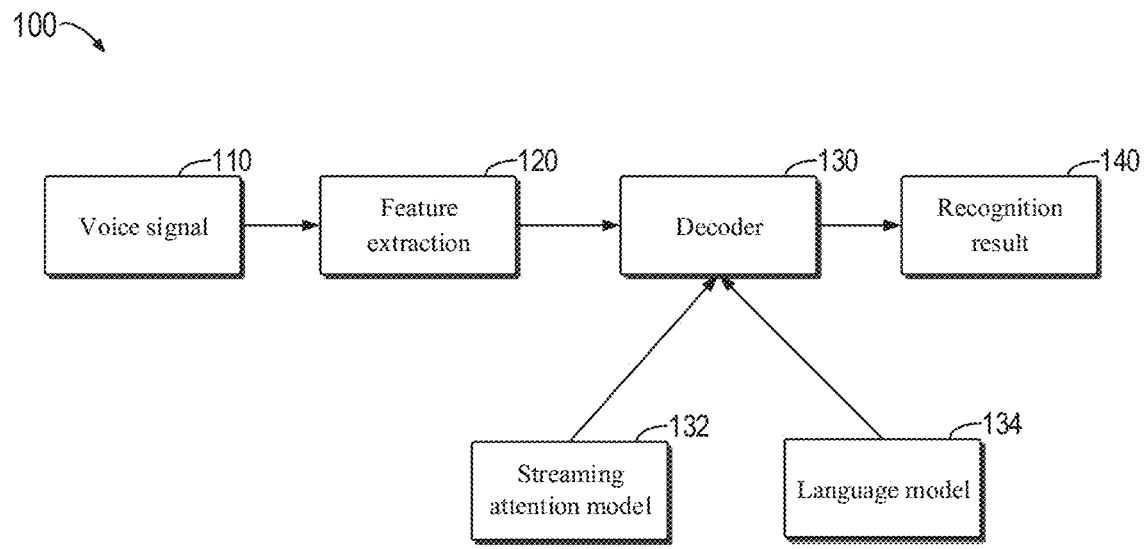
FIG. 1 shows a schematic diagram of a process of voice recognition according to an embodiment of the present disclosure.

Embodiments of the present disclosure will be described in more detail below with reference to the accompanying drawings. While some embodiments of the present disclosure are shown in the accompanying drawings, it should be understood that the present disclosure may be implemented by various approaches, and should not be construed as being limited to the embodiments set forth herein. On the contrary, these embodiments are provided to more thoroughly and completely understand the present disclosure. It should be understood that the accompanying drawings and embodiments of the present disclosure are not intended to limit the scope of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The term "some embodiments" should be construed as "at least some embodiments." Other explicit and implicit definitions may be further included below.

An attention model is an acoustic modeling technology of voice recognition based on an encoder-decoder structure, and can improve the prediction effect on a long sequence. For example, an encoder can code an inputted audio feature to obtain a hidden feature, then the attention model assigns corresponding weights to different parts of the hidden feature, and finally a decoder outputs corresponding texts based on different modeling granularities. A streaming attention model is an attention model that supports streaming processing, and can realize real-time voice recognition processing. Streaming means that small voice fragments (instead of requiring a whole sentence) can be directly incrementally decoded fragment by fragment. The streaming attention model needs to decode a current voice fragment based on a historical state, and therefore belongs to a history-dependent acoustic model.

In a conventional decoder based on the history-dependent acoustic model, the merge of acoustic paths needs to consider historical dependency of the acoustic model itself. For example, the merge of acoustic paths needs to consider a historical state of the acoustic model. It is generally considered that one-hot eigenvectors outputted in different historical states of the model, or different historical states of the model represent different acoustic paths, and cannot be merged, thereby resulting in the path expansion during decoding and affecting the decoding speed. In addition, the accuracy rate of a voice recognition system may also be affected.

Thus, some embodiments of the present disclosure present a solution for recognizing and decoding a voice based on the streaming attention model. The inventors of the present disclosure find that acoustic score calculating of a current voice may be only affected by a last voice fragment and may not be related with earlier syllable voice history. Based on this assumption, for a plurality of candidate acoustic paths, acoustic paths with identical last syllables are merged, thereby improving the accuracy rate and decoding speed of the voice recognition system based on the streaming attention model. Some example implementations of some embodiments of the present disclosure will be described in detail below with reference to FIG. 1-8.

FIG. 1 shows a schematic diagram of a process 100 of voice recognition according to an embodiment of the present disclosure. Generally, a voice recognition system may include components, such as an acoustic model, a language model, and a decoder. As shown in FIG. 1, after obtaining a collected voice signal 110, signal processing and feature extraction on the voice signal 110 are first performed at block 120, including extracting a feature from the inputted voice signal 110, for subsequent processing by the acoustic model and so on. Alternatively, the feature extraction process further includes some other signal processing technologies, to reduce the impact of environmental noise or other factors on features.

Referring to FIG. 1, after completing feature extraction, extracted features are inputted into a decoder 130, and the decoder 130 processes the features and outputs a text recognition result 140. The decoder 130 finds a word sequence of a voice signal with a maximum output probability based on an acoustic module (e.g., the streaming attention model 132) and a language model 134, where the streaming attention model 132 can realize conversion from a voice to syllables, and the language model 134 can realize conversion from the syllables to a text.

In some embodiments, the streaming attention model 132 is configured for modeling for voice fragments, a modeling unit thereof may be, e.g., a syllable, and the streaming attention model may be a streaming multi-layer truncated attention (SMLTA) model, where the "streaming" means that small voice fragments (instead of requiring a whole sentence) can be directly decoded incrementally fragment by fragment, the "multi-layer" means to stack multi-layer attention models, and the "truncated" means to segment a voice into a plurality of small fragments using peak information of a connectionist temporal classification (CTC) model. Modeling and decoding of the attention model may be performed on the small fragments. Such a SMLTA model can support real-time streaming voice recognition, and achieve a high recognition accuracy rate. The CTC model is an end-to-end model that is used for voice recognition of a large number of words, such that an acoustic model structure of a hybrid deep neural network (DNN)+a hidden Markov model (HMM) is completely replaced by a unified neural network structure, thereby greatly simplifying the structure and training difficulty of the acoustic model, and further improving the accuracy rate of a voice recognition system.

The language model 134 is configured for modeling for a language. Generally, a statistical N-Gram grammar may be used, i.e., statistical probabilities of N words before or after a word. It should be understood that any language model that is known or will be developed in the future may be used in combination with some embodiments of the present disclosure. In some embodiments, the streaming attention model 132 may be trained and/or may work based on a voice database, while the language model 134 may be trained and/or may work based on a text database.

The decoder 130 may implement dynamic decoding based on results outputted by the streaming attention model 132 and the language model 134. According to some embodiments of the present disclosure, the decoder 130 may merge acoustic paths with identical last syllables among a plurality of candidate acoustic paths, thereby improving the accuracy rate and decoding speed of the voice recognition system based on the streaming attention model. The following references further describe some example implementations in which the decoder merges the acoustic paths.

Figure 2:
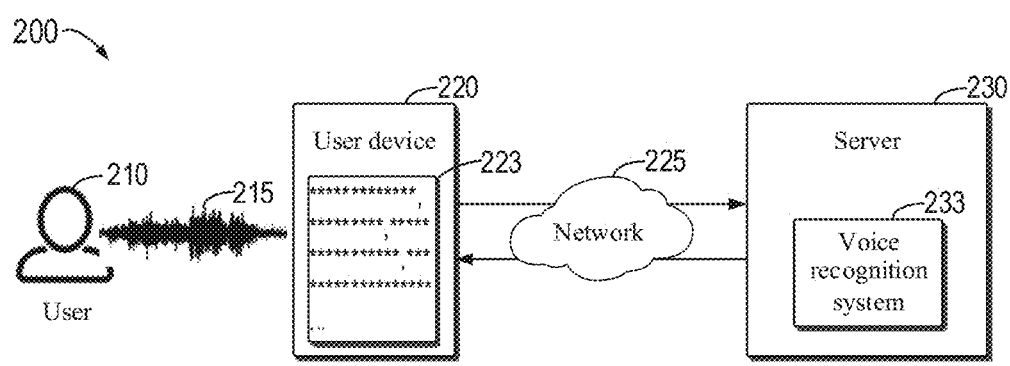
FIG. 2 shows a schematic diagram of an example scenario of voice recognition according to an embodiment of the present disclosure.

FIG. 2 shows a schematic diagram of an example scenario 200 of voice recognition according to an embodiment of the present disclosure. It should be understood that the scenario 200 is only an example scenario that can be implemented in some embodiments of the present disclosure, and is not used to limit the scope of protection of the present disclosure.

As shown in FIG. 2, in the scenario 200, a user 210 is performing voice input towards his user device 220, and a voice 215 (i.e., sound) generated by the user 210 is collected by the user device 220. For example, the voice 215 may be collected by a sound collecting device (e.g., a microphone) of the user device 220. The user device 220 may be any electronic device capable of collecting voice signals, including but not limited to a smartphone, a tablet computer, a desktop computer, a notebook computer, a smart wearable device (e.g., a smart watch, and smart glasses), a navigation device, a multimedia player device, an educational device, a gaming device, a smart speaker, and the like.

In the process of collecting the voice 215, the user device 220 may send the voice 215 to a server 230 in fragments via a network 225. The server 230 includes a voice recognition system 233 (the voice recognition system 233 may include the streaming attention model 132 and the decoder 130 capable of merging decoding paths according to some embodiments of the present disclosure) for voice recognition according to some embodiments of the present disclosure. The network 225 may be any wired network, wireless network, or a combination of a wired network and a wireless network. The voice recognition system 233 may be trained by training data, such that the voice recognition system can realize real-time and accurate voice recognition. After completing the recognition, an recognition result can be sent to the user device 220 via the network 225.

The user device 220 can display the recognition result in real time through display 223 of the user device, and the user 210 may perform voice input using, e.g., a voice input program on the user device 220. Since some embodiments of the present disclosure can recognize the voice in real time, as the voice 215 is continuously generated, the recognition result displayed on the display 223 is also dynamically changing, such that the user can know about the recognized result in real time, thereby improving the user experience. In some embodiments, the user device 220 may not include the display 223; and instead, the user device 220 may output the recognition result through its audio output device (e.g., a speaker). In some other embodiments, the server 230 may directly perform further actions based on the recognition result without sending the recognition result of the voice to the user device 220.

It should be understood that while the environment 200 of FIG. 2 shows the voice recognition system 233 being deployed on the server 230 side remote from the user device 220, the voice recognition system 233 may alternatively be deployed on the user device 220 locally. Alternatively, a part of the voice recognition system 233 may be deployed on the user device 220 locally, and another part of the voice recognition system may be deployed on the server 230 side, or the voice recognition system 233 may be deployed on a plurality of servers or clouds in a distributed manner. Some embodiments of the present disclosure do not limit the deployment manner and location of the voice recognition system 233.

Figure 3:
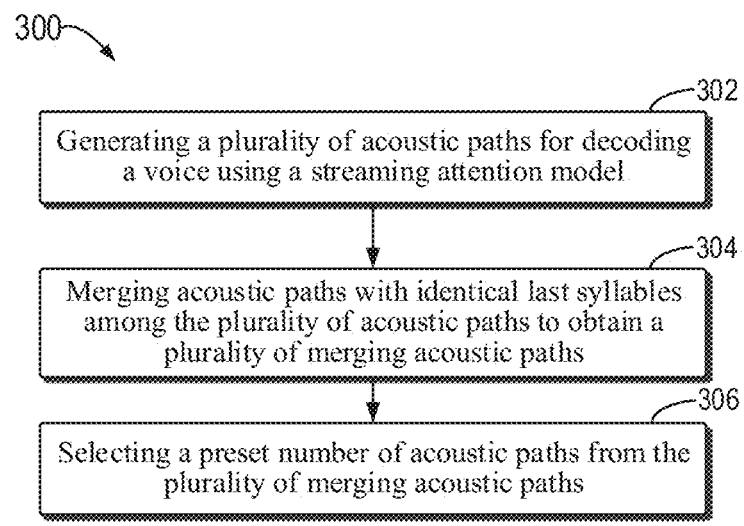
FIG. 3 shows a flowchart of a method for recognizing and decoding a voice based on a streaming attention model according to an embodiment of the present disclosure.

FIG. 3 shows a flowchart of a method 300 for recognizing and decoding a voice based on a streaming attention model according to an embodiment of the present disclosure. It should be understood that the method 300 may be executed by the above server 230 or user device 220 described with reference to FIG. 2, or a combination thereof.

Block 302: generating a plurality of acoustic paths for decoding a voice using a streaming attention model. For example, a plurality of candidate acoustic paths is selected when decoding a last voice fragment, the streaming attention model 132 may generate a plurality of acoustic paths for a current voice fragment based on the candidate paths and features of a current voice. In some embodiments of the present disclosure, a voice fragment may refer to a syllable, which may represent a fragment of audio features, or may be referred to as a beat.

Block 304: merging acoustic paths with identical last syllables among the plurality of acoustic paths to obtain a plurality of merging acoustic paths. The inventors of the present disclosure find that acoustic score calculating of a current voice fragment may be only affected by the last voice fragment, and may not be associated with or has a little association with earlier voice fragment history. Therefore, among the plurality of acoustic paths generated by the streaming attention model 132, the decoder 130 may merge the acoustic paths with the identical last syllables among the plurality of acoustic paths without considering whether earlier historical states of the paths are identical. In this way, the number of decoded acoustic paths can be reduced.

Block 306: selecting a preset number of acoustic paths from the plurality of merging acoustic paths. For example, the decoder 130 may select some paths with highest total decoding scores from the merging acoustic paths as candidate acoustic paths. In some embodiments, the total decoding score of some embodiments of the present disclosure includes not only an acoustic model score from the streaming attention model 132, but also a language model score from the language model 134. In this way, the flexibility and accuracy rate of the voice recognition system can be increased by increasing the impact of the language model on acoustic path clipping.

In addition, for subsequent voice fragments in a streaming voice, steps 302-306 in the method 300 may be repeatedly performed, until all paths reach an end state. Therefore, some embodiments of the present disclosure present an assumption that acoustic score calculating of the current voice fragment is only affected by a last voice fragment prior to the current voice fragment and has nothing to do with earlier voice history, and merge the acoustic paths with the identical last syllables among the plurality of candidate acoustic paths, thereby improving the accuracy rate and decoding speed of the voice recognition system based on the streaming attention model.

In order to solve the problem that a history-dependent acoustic model cannot merge decoding paths due to different acoustic histories during decoding, and the problem of decoding path expansion and slowing decoding speed that are further caused, some embodiments of the present disclosure present a method for merging paths for an attention-based acoustic model. The method is based on an assumption that during calculation of the attention model, the acoustic score calculation of a current voice is only affected by a last voice prior to the current voice, and has nothing to do with earlier history. In this way, merging of the decoded acoustic paths is increased, and the number of acoustic paths is reduced, thereby avoiding the acoustic path expansion, such that the decoding speed is faster.

In some embodiments, the method 300 may further include receiving a new voice signal including a new voice fragment, and then generating a new candidate acoustic path based on the candidate acoustic path and the features of the new voice signal. In some embodiments, after completing receiving the voice, a final voice recognition result is determined based on the total decoding score of a final candidate acoustic path.

Figure 4:
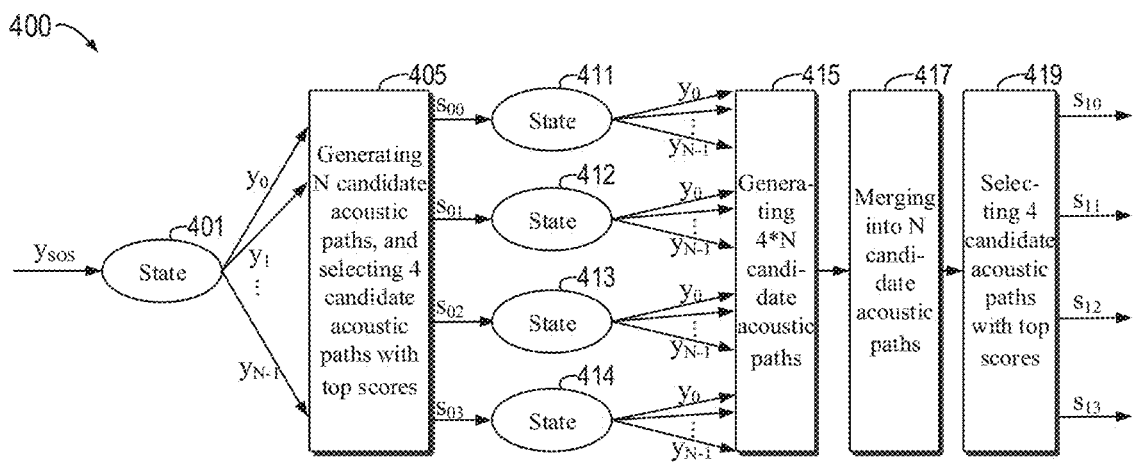
FIG. 4 shows a schematic diagram of a process of selecting a candidate acoustic path according to an embodiment of the present disclosure.

FIG. 4 shows a schematic diagram of a process 400 of selecting a candidate acoustic path according to an embodiment of the present disclosure. It should be understood that the process 400 of FIG. 4 may be an example implementation of the above method of FIG. 3.

Referring to FIG. 4, when a voice recognition process is started, an initial one-hot vector $y_{sos}$ is obtained, and an initial state 401 is determined, which may be historical information of the streaming attention model for the voice fragment. N modeling units may be set in the streaming attention model, the number N may be different depending on different languages and/or model settings, and the number may be, for example, several thousands. Based on the initial state 401 and voice features, a plurality of acoustic paths of N one-hot vectors (e.g., y0, y1, . . . , yN−1 in FIG. 4) may be generated and scores thereof may be determined. At block 405: after the state 401 is expanded into corresponding N candidate acoustic paths, a preset number of acoustic paths with top-ranked scores may be selected. In some embodiments of the present disclosure, 4 acoustic paths with top scores may be selected as candidate acoustic paths; and of course, other number of acoustic paths may also be selected.

After selecting the top 4 candidate acoustic paths, 4 paths and 4 historical states are obtained accordingly, namely states 411, 412, 413, and 414. Then, for a newly received voice fragment, each of the 4 acoustic paths is expanded into N new paths respectively, thereby generating 4*N candidate acoustic paths at block 415.

Further referring to FIG. 4, according to some embodiments of the present disclosure, at block 417, a plurality of the generated 4*N candidate acoustic paths is merged, to obtain N candidate acoustic paths by merging. While historical states of these merging candidate acoustic paths may be different, the inventors find that acoustic score calculating of a current voice may be only affected by a last voice and may have nothing to do with earlier history. Therefore, some embodiments of the present disclosure can merge paths with identical last syllables among the 4*N candidate acoustic paths, thereby reducing the number of decoding paths, and avoiding the decoding path expansion. Some example implementations of merging the plurality of acoustic paths are described below with reference to FIG. 5.

At block 419, 4 acoustic paths with top scores are selected from merging N candidate acoustic paths as candidate acoustic paths of the voice fragment. Then, for subsequent voices received by streaming, steps 415-417 may be repeatedly performed, until completing processing all voices. Since each candidate acoustic path of some embodiments of the present disclosure is obtained by merging a plurality of candidate acoustic paths, some embodiments of the present disclosure can retain more paths with the same calculating workload, thereby improving the accuracy rate of voice recognition.

Figure 5:
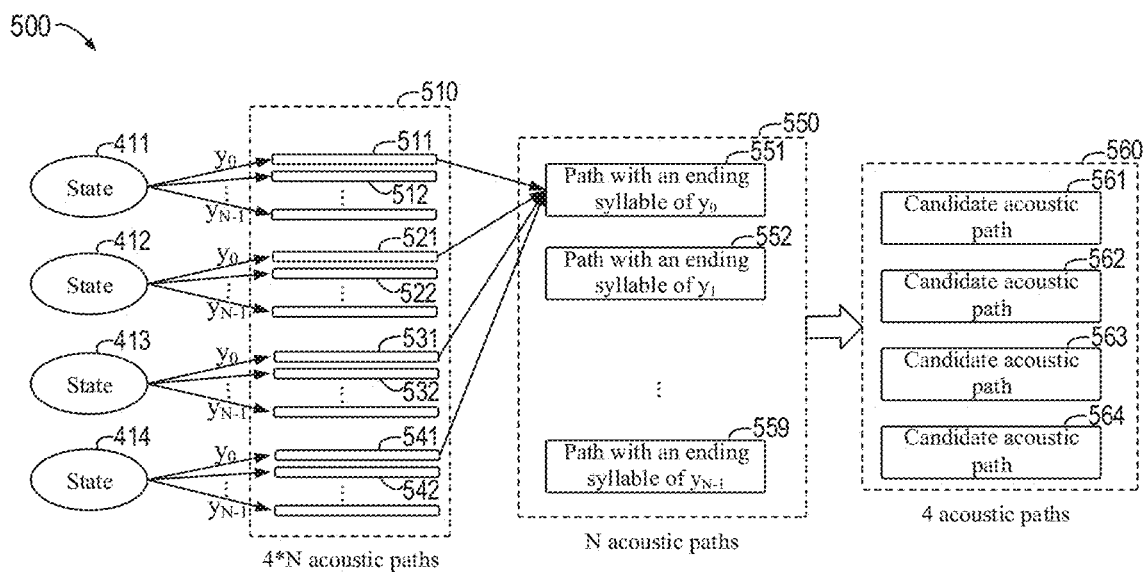
FIG. 5 shows a schematic diagram of a process for merging candidate acoustic paths according to an embodiment of the present disclosure.

FIG. 5 shows a schematic diagram of a process 500 for merging candidate acoustic paths according to an embodiment of the present disclosure. As shown in FIG. 5, 4 historical states 411, 412, 413, and 414 are expanded to obtain 4*N candidate acoustic path sets 510, where each state may be expanded into N candidate acoustic paths based on N modeling units, and a decoding score of each candidate acoustic path may be calculated.

In some embodiments of the present disclosure, for the generated 4*N candidate acoustic paths, acoustic paths with identical last syllables of these acoustic paths may be grouped together, without considering whether earlier historical states of the paths are identical. As shown in FIG. 5, a plurality of acoustic paths 511, 521, 531, and 541 with ending syllables of $y_0$ in the candidate acoustic path set 510 may be merged as a path 551 with the ending syllable of $y_0$, for example, may be merged into the acoustic path with a highest score among the acoustic paths 511, 521, 531, and 541. A plurality of acoustic paths 512, 522, 532, and 542 with ending s of y1 in the candidate acoustic path set 510 is merged as a path 552 with the ending syllable of $y_1$ (to avoid confusion between lines, FIG. 5 does not show arrows of merging paths with the ending syllable of $y_1$), in a similar way, acoustic paths are merged until a path 559 with an ending syllable of $y_{N-1}$ is acquired by merging, thereby forming a merging candidate acoustic path set 550.

In some embodiments, the merging the plurality of acoustic paths with ending syllables of $y_0$ may include: first identifying the plurality of acoustic paths with last syllables of $y_0$, i.e., identifying the acoustic paths 511, 521, 531, and 541; then determining an acoustic path (e.g., the path 511) with a highest total decoding score of these paths, and merging historical states of the acoustic paths into the acoustic path with the highest total decoding score (e.g., the path 511), such that more paths on the decoding diagram can be merged, thereby reducing the number of decoding paths. Similarly, the plurality of acoustic paths with last syllables of $y_1$ may be similarly merged, until merging the plurality of acoustic paths with last syllables of $y_{N-1}$. In some embodiments, when expanding acoustic paths, a plurality of acoustic paths with identical language model states and identical one-hot vectors of the last syllables of the acoustic model may be merged into a given group, thereby reducing the number of decoded acoustic paths.

Further referring to FIG. 5, then, 4 candidate acoustic paths with highest total decoding scores are selected from the merging candidate acoustic path set 550, to form a final candidate acoustic path set 560, which includes candidate acoustic paths 561, 562, 563, and 564. In some embodiments, N total decoding scores of N acoustic paths in the merging acoustic path set 550 may be ranked, where each total decoding score may include an acoustic model score from the streaming attention model 132 and a language model score from the language model 134, and then select 4 acoustic paths of top 4 rankings from set 550 of a plurality of merging acoustic paths, as selected candidate acoustic paths.

Figure 6:
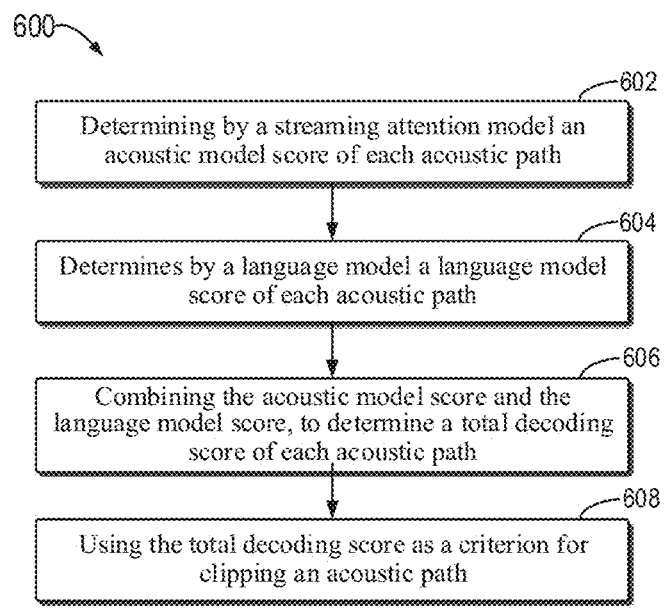
FIG. 6 shows a schematic diagram of a method for clipping an acoustic path using a total decoding score according to an embodiment of the present disclosure.

FIG. 6 shows a schematic diagram of a method 600 for clipping an acoustic path using a total decoding score according to an embodiment of the present disclosure. It should be understood that the method 600 may be included in the above action 302 described in FIG. 3.

At block 602, the streaming attention model 132 determines an acoustic model score of each acoustic path. At block 604, the language model 134 determines a language model score of each acoustic path. At block 606, the decoder 130 combines the acoustic model score and the language model score of each acoustic path, to determine a total decoding score of each acoustic path. At block 608, the decoder 130 may use the total decoding score as a criterion for clipping an acoustic path.

Therefore, the method 600 according to some embodiments of the present disclosure uses the total decoding score as a path clipping criterion in the process of clipping a decoding path, increases the impact of the language model on path expansion, and can quickly interfere with decoding path expansion by adjusting the language model, thereby increasing the flexibility of a voice recognition system. In addition, some embodiments of the present disclosure can correct an acoustic model using the language model score, thereby improving the fault tolerance of the voice recognition system. In contrast, the conventional method only refers to a score of the acoustic model itself when clipping a decoding acoustic path, thereby resulting in a fixed syllable of a given audio recognition result, losing the flexibility of quickly interfering with the recognition result by language model optimization, and reducing the feasibility of improving the recognition rate by language model adaptation in different vertical domains.

Therefore, according to the method 600 according to some embodiments of the present disclosure, acoustic path clipping does not only depend on an acoustic model score of the streaming attention model itself, the acoustic model score and the language model score are combined as the path clipping criterion, thereby not only improving the accuracy of path clipping, but also quickly interfering with the decoding path expansion by adjusting the language model, and increasing the flexibility of the voice recognition system.

Figure 7:
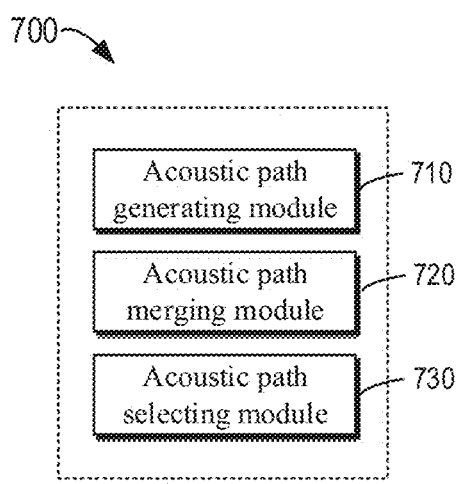
FIG. 7 shows a block diagram of an apparatus for recognizing and decoding a voice based on a streaming attention model according to an embodiment of the present disclosure.

FIG. 7 shows a block diagram of an apparatus 700 for recognizing and decoding a voice based on a streaming attention model according to an embodiment of the present disclosure. As shown in FIG. 7, the apparatus 700 includes an acoustic path generating module 710, an acoustic path merging module 720, and an acoustic path selecting module 730. The acoustic path generating module 710 is configured to generate a plurality of acoustic paths for decoding the voice using the streaming attention model. The acoustic path merging module 720 is configured to merge acoustic paths with identical last syllables of the plurality of acoustic paths to obtain a plurality of merging acoustic paths. The acoustic path selecting module 730 is configured to select a preset number of acoustic paths from the plurality of merging acoustic paths.

In some embodiments, the acoustic path generating module 710 includes: a second acoustic path generating module configured to generate the plurality of acoustic paths based on a candidate acoustic path of a voice prior to the last voice and a plurality of modeling units of the streaming attention model.

In some embodiments, the acoustic path generating module 710 includes: an acoustic score determining module configured to determine an acoustic model score of each of the plurality of acoustic paths using the streaming attention model; a language score determining module configured to determine a language model score of each of the plurality of acoustic paths using a language model; and a total decoding score determining module configured to determine a total decoding score of each acoustic path based on the acoustic model score and the language model score of each acoustic path, for clipping the acoustic path.

In some embodiments, the acoustic path merging module 720 includes: a path set identifying module configured to identify a set of first acoustic paths with last syllables being first syllables among the plurality of acoustic paths; a highest total score determining module configured to determine a first acoustic path with a highest total decoding score in the first acoustic path set; and a path set merging module configured to merge historical states of the acoustic paths in the first acoustic path set into the determined first acoustic path.

In some embodiments, the acoustic path merging module 720 includes: a group merging module configured to merge a plurality of acoustic paths with identical language model states and identical one-hot vectors of the last syllables of the acoustic model into a given group.

In some embodiments, the acoustic path selecting module 730 includes: an acoustic path ranking module configured to rank a plurality of total decoding scores of the plurality of merging acoustic paths, each total decoding score including the acoustic model score from the streaming attention model and the language model score from the language model; and a candidate path selecting module configured to select a preset number of top-ranked acoustic paths from the plurality of merging acoustic paths as candidate acoustic paths.

In some embodiments, the apparatus 700 further includes: a voice receiving module configured to receive a new voice signal including a new voice; and a candidate path generating module configured to generate a new candidate acoustic path based on the candidate acoustic path and features of the new voice signal.

In some embodiments, the apparatus 700 further includes: a recognition result determining module configured to determine, in response to completing receiving the voice, a final voice recognition result based on the total decoding score of each candidate acoustic path.

It should be understood that the acoustic path generating module 710, the acoustic path merging module 720, and the acoustic path selecting module 730 shown in FIG. 7 may be included in one or more electronic devices. Further, it should be understood that the modules shown in FIG. 7 may execute the steps and/or actions in the method and/or process with reference to some embodiments of the present disclosure.

Figure 8:
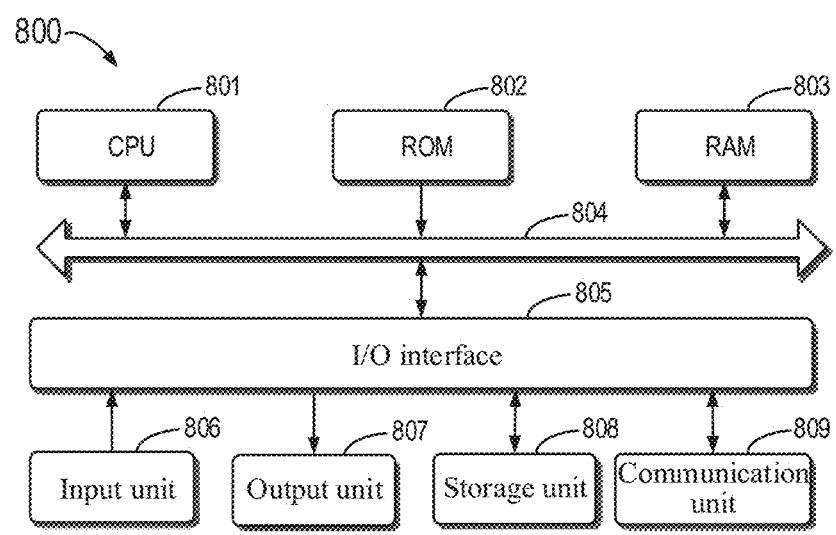
FIG. 8 shows a block diagram of an electronic device capable of implementing a plurality of embodiments of the present disclosure.

FIG. 8 shows a schematic block diagram of an example device 800 that may be configured to implement embodiments of the present disclosure. It should be understood that the device 800 may be configured to implement the apparatus 700 for recognizing and decoding a voice based on a streaming attention model, or the user device 220, or the server 230 described in the present disclosure. As shown in the figure, the device 800 includes a central processing unit (CPU) 801, which may execute various appropriate actions and processes in accordance with computer program instructions stored in a read-only memory (ROM) 802 or computer program instructions loaded into a random access memory (RAM) 803 from a storage unit 808. The RAM 803 may further store various programs and data required by operations of the device 800. The CPU 801, the ROM 802, and the RAM 803 are connected to each other through a bus 804. As shown in FIG. 8, an input/output (I/O) interface 805 is also connected to the bus 804.

A plurality of components in the device 800 is connected to the I/O interface 805, including: an input unit 806, such as a keyboard, and a mouse; an output unit 807, such as various types of displays and speakers; a storage unit 808, such as a magnetic disk, and an optical disk; and a communication unit 809, such as a network card, a modem, and a wireless communication transceiver. The communication unit 809 allows the device 800 to exchange information/data with other devices via a computer network, e.g., the Internet, and/or various telecommunication networks.

The processing unit 801 executes various methods and processes described above, such as the methods 300 and 600. For example, in some embodiments, the method may be implemented in a computer software program that is tangibly included in a machine readable medium, such as the storage unit 808. In some embodiments, a part or all of the computer program may be loaded and/or installed onto the device 800 via the ROM 802 and/or the communication unit 809. When the computer program is loaded into the RAM 803 and executed by the CPU 801, one or more actions or steps of the method described above may be executed. Alternatively, in other embodiments, the CPU 801 may be configured to execute the method by any other appropriate approach (e.g., by means of firmware).

The functions described herein above may be performed, at least in part, by one or more hardware logic components. For example, without limitation, examples of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above provide examples of implementing the claims.

What is claimed is:

1. A method for recognizing and decoding a voice based on a streaming attention model, comprising:
   generating a plurality of acoustic paths for decoding the voice using the streaming attention model;
   merging acoustic paths with identical last syllables among the plurality of acoustic paths to obtain a plurality of merging acoustic paths, wherein the merging comprises: dividing the plurality of acoustic paths into a plurality of groups each including a plurality of to-be-merged acoustic paths each including a sequence of syllables, wherein all last syllables of the to-be-merged acoustic paths in each of the plurality of groups are identical; and merging all to-be-merge acoustic paths in each of the plurality of groups into one merging acoustic path; and
   selecting a preset number of acoustic paths from the plurality of merging acoustic paths.

2. The method according to claim 1, wherein the generating a plurality of acoustic paths for decoding the voice using the streaming attention model comprises:
   receiving a voice input including a previous voice and a current voice posterior to the previous voice; and
   generating the plurality of acoustic paths of the current voice based on a candidate acoustic path of the previous voice and a plurality of modeling units of the streaming attention model.

3. The method according to claim 1, wherein the generating a plurality of acoustic paths for decoding the voice using the streaming attention model comprises:
   determining an acoustic model score of each of the plurality of acoustic paths using the streaming attention model;
   determining a language model score of each of the plurality of acoustic paths using a language model; and
   determining a total decoding score of each acoustic path based on the acoustic model score and the language model score of each acoustic path, for clipping the acoustic path.

4. The method according to claim 3, wherein the merging acoustic paths with identical last syllables among the plurality of acoustic paths to obtain a plurality of merging acoustic paths comprises:
   recognizing a set of first acoustic paths with last syllables being first syllables among the plurality of acoustic paths;
   determining a first acoustic path with a highest total decoding score in the set of first acoustic paths; and
   merging a historical state of each acoustic path in the first acoustic path set into the determined first acoustic path.

5. The method according to claim 3, wherein the merging acoustic paths with identical last syllables among the plurality of acoustic paths to obtain a plurality of merging acoustic paths comprises:
   merging a plurality of acoustic paths with identical language model states and identical one-hot vectors of the last syllables of the acoustic model into a given group.

6. The method according to claim 1, wherein the selecting a preset number of acoustic paths from the plurality of merging acoustic paths comprises:
   ranking a plurality of total decoding scores of the plurality of merging acoustic paths, each total decoding score including the acoustic model score from the streaming attention model and the language model score from the language model; and
   selecting a preset number of top-ranked acoustic paths from the plurality of merging acoustic paths as candidate acoustic paths.

7. The method according to claim 6, wherein the method further comprises:
   receiving a new voice signal including a new voice; and
   generating a new candidate acoustic path based on the candidate acoustic paths and features of the new voice signal.

8. The method according to claim 6, wherein the method further comprises:
   determining, in response to completing receiving the voice, a final voice recognition result based on the total decoding score of each candidate acoustic path.

9. The method according to claim 1, wherein the plurality of groups comprises a first group and a second group, all last syllables of first to-be-merged acoustic paths in the first group is a first given syllable, and all last syllables of second to-be-merge acoustic paths in the second group is a second given syllable different from the first given syllable, wherein the merging comprises merging all first to-be-merged acoustic paths in the first group into one first merging acoustic path, and merging all second to-be-merged acoustic paths in the second group into one second merging acoustic path.

10. An apparatus for recognizing and decoding a voice based on a streaming attention model, comprising:
    at least one processor; and
    a memory storing instructions, wherein the instructions when executed by the at least one processor, cause the at least one processor to perform operations, the operations comprising:
    generating a plurality of acoustic paths for decoding the voice using the streaming attention model;
    merging acoustic paths with identical last syllables among the plurality of acoustic paths to obtain a plurality of merging acoustic paths, wherein the merging comprises: dividing the plurality of acoustic paths into a plurality of groups each including a plurality of to-be-merged acoustic paths each including a sequence of syllables, wherein all last syllables of the to-be-merged acoustic paths in each of the plurality of groups are identical; and merging all to-be-merge acoustic paths in each of the plurality of groups into one merging acoustic path; and
    selecting a preset number of acoustic paths from the plurality of merging acoustic paths.

11. The apparatus according to claim 10, wherein the generating a plurality of acoustic paths for decoding the voice using the streaming attention model comprises:
    receiving a voice input including a previous voice and a current voice posterior to the previous voice; and
    generating the plurality of acoustic paths of the current voice based on a candidate acoustic path of the previous voice and a plurality of modeling units of the streaming attention model.

12. The apparatus according to claim 10, wherein the generating a plurality of acoustic paths for decoding the voice using the streaming attention model comprises:
    determining an acoustic model score of each of the plurality of acoustic paths using the streaming attention model;
    determining a language model score of each of the plurality of acoustic paths using a language model; and
    determining a total decoding score of each acoustic path based on the acoustic model score and the language model score of each acoustic path, for clipping the acoustic path.

13. The apparatus according to claim 12, wherein the merging acoustic paths with identical last syllables among the plurality of acoustic paths to obtain a plurality of merging acoustic paths comprises:
    recognizing a set of first acoustic paths with the last syllables being first syllables among the plurality of acoustic paths;
    determining a first acoustic path with a highest total decoding score in the set of first acoustic paths; and
    merging a historical state of each acoustic path in the first acoustic path set into the determined first acoustic path.

14. The apparatus according to claim 12, wherein the merging acoustic paths with identical last syllables among the plurality of acoustic paths to obtain a plurality of merging acoustic paths comprises:
    merging a plurality of acoustic paths with identical language model states and identical one-hot vectors of the last syllables of the acoustic model into a given group.

15. The apparatus according to claim 10, wherein the selecting a preset number of acoustic paths from the plurality of merging acoustic paths comprises:
    ranking a plurality of total decoding scores of the plurality of merging acoustic paths, each total decoding score including the acoustic model score from the streaming attention model and the language model score from the language model; and
    selecting a preset number of top-ranked acoustic paths from the plurality of merging acoustic paths as candidate acoustic paths.

16. The apparatus according to claim 15, wherein the operations further comprise:
    receiving a new voice signal including a new voice; and
    generating a new candidate acoustic path based on the candidate acoustic path and features of the new voice signal.

17. The apparatus according to claim 15, wherein the operations further comprise:
    determining, in response to completing receiving the voice, a final voice recognition result based on the total decoding score of each candidate acoustic path.

18. A non-transitory computer readable storage medium, storing a computer program, wherein the program, when executed by a processor, causes the processor to perform operations, the operations comprising:
    generating a plurality of acoustic paths for decoding the voice using the streaming attention model;
    merging acoustic paths with identical last syllables among the plurality of acoustic paths to obtain a plurality of merging acoustic paths, wherein the merging comprises: dividing the plurality of acoustic paths into a plurality of groups each including a plurality of to-be-merged acoustic paths each including a sequence of syllables, wherein all last syllables of the to-be-merged acoustic paths in each of the plurality of groups are identical; and merging all to-be-merge acoustic paths in each of the plurality of groups into one merging acoustic path; and selecting a preset number of acoustic paths from the plurality of merging acoustic paths.

\* \* \* \* \*